United States Patent
Brockschmidt et al.

(10) Patent No.: US 10,186,924 B2
(45) Date of Patent: Jan. 22, 2019

(54) METHOD FOR PRODUCING A CORONA SHIELD, FAST-CURING CORONA SHIELD SYSTEM, AND ELECTRIC MACHINE

(75) Inventors: Mario Brockschmidt, Essen (DE); Stefan Kempen, Arnsberg (DE); Friedhelm Pohlmann, Essen (DE); Guido Schmidt, Leichlingen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 1146 days.

(21) Appl. No.: 14/365,158

(22) PCT Filed: Dec. 15, 2011

(86) PCT No.: PCT/EP2011/072942
§ 371 (c)(1),
(2), (4) Date: Jun. 13, 2014

(87) PCT Pub. No.: WO2013/087112
PCT Pub. Date: Jun. 20, 2013

(65) Prior Publication Data
US 2014/0327334 A1    Nov. 6, 2014

(51) Int. Cl.
*H01B 3/00* (2006.01)
*H02K 3/40* (2006.01)
*H02K 15/10* (2006.01)

(52) U.S. Cl.
CPC ............... *H02K 3/40* (2013.01); *H01B 3/004* (2013.01); *H02K 15/105* (2013.01)

(58) Field of Classification Search
CPC .......... H01B 3/004; H02K 15/105; H02K 3/40
See application file for complete search history.

(56) References Cited

U.S. PATENT DOCUMENTS

| | | | | |
|---|---|---|---|---|
| 3,824,683 A | * | 7/1974 | Rhudy | H02K 3/40 29/596 |
| 4,999,136 A | | 3/1991 | Su | 252/512 |
| 5,319,276 A | | 6/1994 | Schuler | 310/196 |
| 5,658,712 A | | 8/1997 | Steinmann et al. | 430/325 |
| 5,969,456 A | * | 10/1999 | Okamoto | H01F 5/06 174/127 |
| 6,096,413 A | | 8/2000 | Kalinoski | 174/358 |
| 6,103,640 A | | 8/2000 | Yoshikawa | 428/194 |
| 6,261,680 B1 | * | 7/2001 | Denman | H01B 1/20 257/E23.121 |
| 6,645,886 B1 | | 11/2003 | Muhrer et al. | 442/139 |

(Continued)

FOREIGN PATENT DOCUMENTS

CN    1992100 A    7/2007
CN    101014657 A    8/2007

(Continued)

OTHER PUBLICATIONS

Chinese Office Action dated Oct. 19, 2015 issued in corresponding Application No. 201180075589.6 with English translation.

(Continued)

*Primary Examiner* — Mark Kopec
*Assistant Examiner* — Jaison P Thomas
(74) *Attorney, Agent, or Firm* — Ostrolenk Faber LLP

(57) ABSTRACT

The corona shield can be applied in electric machines in a faster manner by using radiation-cured materials.

8 Claims, 3 Drawing Sheets

(56) References Cited

U.S. PATENT DOCUMENTS

| | | | |
|---|---|---|---|
| 6,697,712 B1* | 2/2004 | Bertini | H01B 9/02 |
| | | | 137/599.11 |
| 7,208,192 B2* | 4/2007 | Bunyan | H01L 23/3737 |
| | | | 156/307.3 |
| 7,875,347 B2 | 1/2011 | Irwin et al. | 428/323 |
| 2001/0028953 A1 | 10/2001 | Bluem | 428/355 AC |
| 2005/0194551 A1* | 9/2005 | Klaussner | H02K 3/40 |
| | | | 250/505.1 |
| 2007/0052125 A1 | 3/2007 | Kalinoski et al. | |
| 2007/0117911 A1 | 5/2007 | Irwin et al. | 524/495 |
| 2007/0178298 A1 | 8/2007 | Suzuki et al. | |
| 2007/0243318 A1 | 10/2007 | Meichsner | |
| 2008/0033083 A1 | 2/2008 | Li et al. | |
| 2011/0067918 A1 | 3/2011 | Whu | 174/388 |
| 2011/0230617 A1 | 9/2011 | Haremza et al. | |
| 2011/0236682 A1 | 9/2011 | Okamoto | 428/355 CN |
| 2012/0133072 A1 | 5/2012 | Bunyan | 264/104 |
| 2013/0299736 A1 | 11/2013 | Haremza et al. | 252/182.15 |
| 2013/0309423 A1* | 11/2013 | Roger | H01B 1/04 |
| | | | 428/1.4 |

FOREIGN PATENT DOCUMENTS

| | | |
|---|---|---|
| CN | 101189686 A | 5/2008 |
| CN | 101535406 A | 9/2009 |
| CN | 102216400 A | 10/2011 |
| DE | 3045462 A1 | 6/1981 |
| DE | 42 18 928 A1 | 12/1993 |
| DE | 4218928 A1 | 12/1993 |
| EP | 1118086 | 11/2002 |
| EP | 1716580 | 1/2008 |
| EP | 1995850 A1 | 11/2008 |
| SU | 1787306 | 1/1993 |
| WO | WO 00/13191 A1 | 3/2000 |
| WO | 2010/055050 | 5/2010 |

OTHER PUBLICATIONS

International Search Report, dated Aug. 22, 2012, issued in connection with corresponding International Application No. PCT/EP2011/072942. Total 10 pages.

International Search Report dated Aug. 22, 2012 issued in corresponding International patent application No. PCT/EP2011/072942.

International Preliminary Report on Patentability dated Nov. 28, 2013 issued in corresponding International patent application No. PCT/EP2011/072942.

Notification of the First Office Action with Search Report dated Mar. 3, 2017 in corresponding Chinese Patent Application No. 201380017670.8 (with English language translation)(total 15 pages).

* cited by examiner

METHOD FOR PRODUCING A CORONA SHIELD, FAST-CURING CORONA SHIELD SYSTEM, AND ELECTRIC MACHINE

CROSS-REFERENCE TO RELATED APPLICATIONS

The present application is a 35 U.S.C. §§ 371 national phase conversion of PCT/EP2011/072942, filed Dec. 15, 2011, the contents of which are incorporated by reference herein. The PCT International Application was published in the German language.

TECHINICAL FIELD

The invention relates to a method for producing a corona shield, a fast-curing corona shield system, and an electric machine.

TECHNICAL BACKGROUND

A corona shield is used in many electrical applications, in particular in generators, as described in EP 1 995 850 B1.

In order to avoid partial discharges, the main insulation of generator winding bars at operating voltages of a few kilovolts has to be shielded from cavities and detachments by an inner and an outer conducting layer. The electric field strength is reduced in the main insulation proceeding from the inner potential grading 10 (FIG. 1) (IPG) in the radial direction as far as the outer corona shield 13 (FIG. 1) (OCS). At the end of the generator winding bar, in the region of the exit point of the winding bars from the stator laminate stack, the OCS ends, while the main insulation is continued in the direction of the bar end. This arrangement constitutes a typical sliding arrangement having an extremely low partial discharge inception voltage. In this region the electric field also has, in addition to the radial component, a strong nonlinear tangential component parallel to the insulating material surface/interface. The highest field strength occurs at the end/edge of the OCS. Therefore, it is necessary to provide for a field control at the edge of the outer corona shield and for an increase in dielectric strength in the vicinity of the exposed main insulation. This is usually achieved by the production of an overhang corona shield 16 (FIG. 1). In order to suppress creeping discharges, use is usually made of resistive potential gradings by means of semiconducting varnishes or tapes predominantly on the basis of silicon carbide or other electrically semiconducting fillers.

The aim of the potential grading is to make more uniform, and ideally to linearize, the tangential potential reduction along the insulating material surface. This is achieved if the absolute value of the voltage drop per unit length is always the same. A resistance per unit length that is voltage-dependent and location-dependent in the axial direction is produced for this purpose.

In this case, the time duration for sufficiently curing and solidifying hitherto commercial materials is very long particularly in the case of varnishes, but also in the case of tapes, since across a plurality of work shifts a plurality of layers of varnish have to be applied and between applications it is necessary to wait for a certain time interval in order that the subsequent layer can be applied again by overcoating.

The overhang corona shield is realized nowadays either by single- or multi-ply wrapping with electrically semiconducting tapes or by applying one or a plurality of layers of an electrically semiconducting varnish.

The semiconducting tapes usually consist of an electrically nonconductive carrier material (e.g. polyester nonwoven, polyester fabric or glass fabric) and a reaction resin (e.g. epoxidized phenol novolaks, often accelerated by means of dicyandiamine) in a prereacted stage (B-stage). For complete curing, tapes of this type have to be cured for 2 hours at approximately 165° C. or for up to 12 hours at only 120° C. Silicon carbide is usually used as filler nowadays, wherein the average grain size determines the resulting electrical resistance of the tape.

Semiconducting varnishes are typically solvent-based systems such as phenolic resins comprising semiconducting or semiconducting-functionalized fillers.

At room temperature, a time of a plurality of hours (up to 4 or more) is required here to obtain overcoatability. Since it is often necessary to produce up to five layers one above another, this is a time-consuming process.

The high drying time follows from the required high solvent content (approximately up to 30%). This must be rejected, however, on account of environmental protection and occupational safety aspects. In this case there is also the risk of initiating a hidden defect. Present-day systems are additionally restricted to low heat stability classes.

Ready-mixed varnishes are offered commercially only for specific resistance ranges. Further resistance ranges are required, however, which are produced manually by dedicated mixing. However, these mixtures have specific disadvantages, such as subsidence/segregation of the filler, the risk of an incorrect mixture, poorer processing properties (e.g. coatability).

Hitherto there have been virtually no satisfactory approaches for accelerating the processing by means of significant reductions of the curing times. The curing times are the slowest step in this manufacturing stage and are thus a speed-determining factor for manufacture.

SUMMARY OF THE INVENTION

Therefore, it is an object of the invention to solve the above problem.

The object is achieved by means of a corona shield disclosed herein, a method as disclosed herein and an electric machine as claimed as disclosed herein.

DESCRIPTION OF EMBODIMENTS

The figures and the description merely illustrate exemplary embodiments of the invention.

Figure 1:
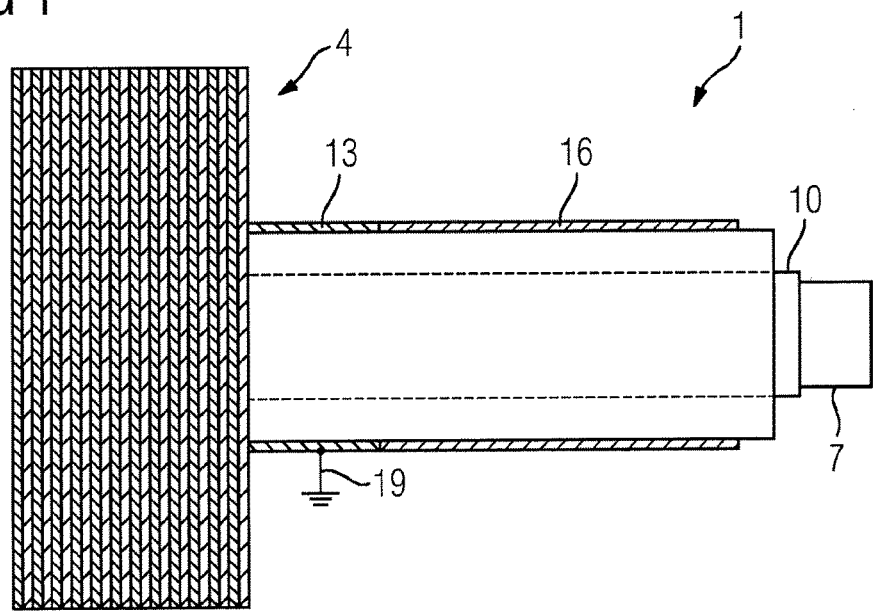
FIG. 1 shows one end of a generator winding bar (prior art)

FIG. 1 shows one end of a generator winding bar. Such an end has an electrical conductor 7, around which an inner potential grading (IPG) 10 is present. Situated around the latter is an outer corona shield (OCS) 13, to one end of which an overhang corona shield 16 is attached. A stator laminate stack 4 has the conductor 7 arranged in it.

If appropriate, a grounding 19 is present at the end.

The invention for the corona shield consists in chemical formulations which serve as varnishes or as matrix materials in tape systems.

Said corona shield can be used as an overhang corona shield 16 in rotary electric machines (generators, motors, . . . ), cable end seals or other systems in which a controlled guided potential reduction is necessary from a design standpoint.

The corona shield preferably comprises a filling consisting of a semiconducting filler that enables the system to be used as an overhang corona shield.

These fillings are preferably silicon carbide and/or graphite.

In this case, fillings of 30% by weight to 90% by weight are advantageously used.

The matrix material for the curable material is preferably monomers whose crosslinking is preferably carried out by one or a plurality of initiators which emit reactive species or undergo transition to an excited state which start/starts the crosslinking.

Such initiators are activated by electromagnetic radiation, which can be for example in the spectral range of infrared, X-ray, ultraviolet and/or gamma radiation.

In addition, secondary accelerators can be used, which can vary or amplify the excitation of the initiators in the wavelength range.

Figure 2:
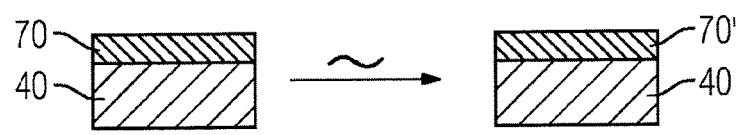
FIGS. 2, 3 schematically show the procedure when applying a corona shield.

FIG. 2 shows a substrate 40, on which such a curable mixture, which is then used for the corona shield, is applied in the form of a layer 70.

As a result of the action of radiation, illustrated here as a wave, the layer 70 cures and forms the cured layer 70'.

Figure 3:
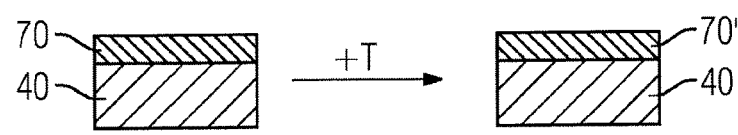

A comparable situation is illustrated in FIG. 3, wherein the layer 70 is cured by a temperature increase (+T).

The procedure in accordance with FIGS. 2 and 3 can be combined. This can preferably constitute a homogeneous mixture of the materials from FIGS. 2, 3 (not illustrated).

Figure 4:
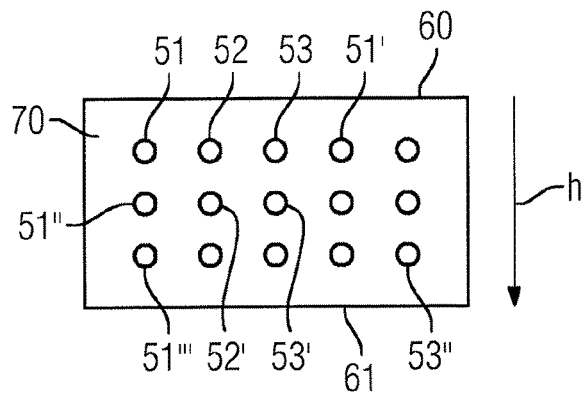
FIGS. 4-6 show various exemplary embodiments of the invention.

FIG. 4 shows a layer 70 to be cured or a curable corona shield in which different types of initiators 51, 52, 53, . . . are present in a matrix to be cured. The different types of initiators 51, 52, 53, . . . are preferably distributed homogeneously in the layer 70 or in the corona shield.

During the irradiation it is possible to use a wide wavelength range or a plurality of selective wavelengths which can penetrate differently over the depth h of the layer 70. In this regard, besides the initiators 51" that are further away from the irradiation surface 60 and, if appropriate, no longer have an effect or have a lesser effect than directly at the irradiation surface 60, types of initiators 53" can be concomitantly present also in the lower region near the base 61, where a wavelength (or wavelength range) can penetrate more deeply as far as the base 61 and is particularly effective for the initiators 53".

Figure 5:
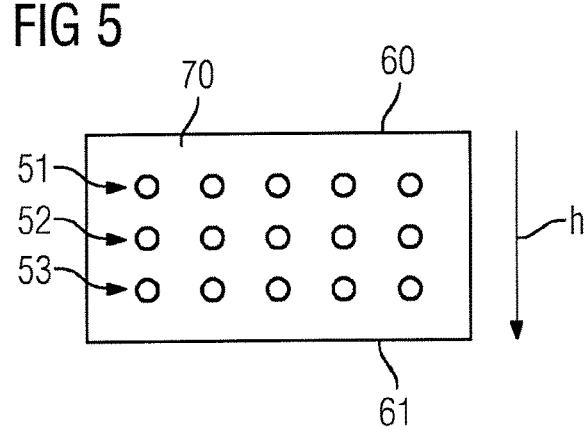

In FIG. 5, in contrast to FIG. 4, the different types of initiators 51, 52, 53 are not distributed homogeneously, but rather are arranged in the layer 70 selectively over the depth h. The different types of initiators 51, 52, 53, . . . are preferably wavelength-dependent in terms of their effect. In the upper region near the irradiation surface 60 there are arranged the types of initiators 51 for which a wavelength can penetrate well as far as this region.

In a second or central region of the layer 70, types of initiators 52 are present for which a further or second wavelength (wavelength range) can penetrate right into the central region of the layer 70 and, in the lower region of the layer 70, only initiators 53 are present for which a further or third wavelength can penetrate well as far as the base 61.

Likewise, near the base 61 or the region relatively far away from the irradiation surface 60, the concentration of one or more initiators can be increased in order to compensate for the lower intensity of the radiation (concentration gradient (not illustrated)).

Figure 6:
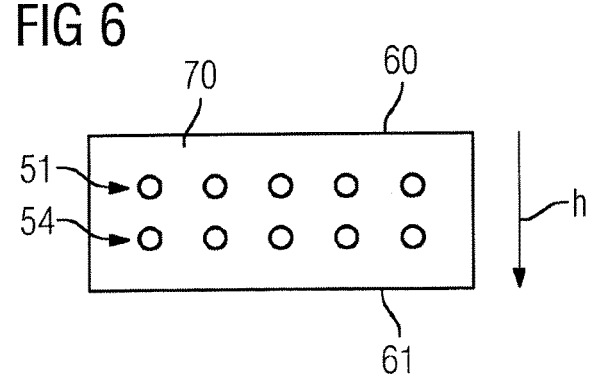

FIG. 6 shows a further exemplary embodiment of the invention. Here, in the layer 70, different types of initiators 51, 54 are likewise present selectively over the height h, here preferably distributed into two regions of the layer 70. However, the types of initiators 51 react to electromagnetic radiation, and, in the deeper region of the layer 70, where the ability of rays to penetrate is poorer, initiators 54 that react to heat are present (inhomogeneous combination of FIGS. 2, 3).

A graded transition of the concentration of the types of initiators is preferably conceivable.

The heating of lower layer regions can be realized in a simple manner, in contrast to introducing electromagnetic radiation in the depth region of a solid material, since electromagnetic radiation is always absorbed in a solid material.

The corona shield comprises a filling (FIGS. 2-6) consisting of a semiconducting filler that enables the system to be used as an overhang corona shield.

The matrix material for the curable material is preferably monomers whose crosslinking is preferably carried out by one or a plurality of initiators which emit reactive species or undergo transition to an excited state which start/starts the crosslinking.

Such initiators are activated by electromagnetic radiation, which can be for example in the spectral range of infrared, X-ray, ultraviolet and/or gamma radiation.

In addition, secondary accelerators can be used, which can vary or amplify the excitation of the initiators in the wavelength range.

In the case of the initiation with the aid of ultraviolet radiation, the activation can be effected for example by means of a free radical or cationic crosslinking mechanism. The activation of such initiators is limited to the type of accelerator correspondingly chosen and is effected exclusively by electromagnetic radiation.

The use of a "dual cure" option is also conceivable, that is to say the admixture of a further initiator, which allows crosslinking by application of temperature and thus allows a selection of the manner of activation for particular cases of use.

The accelerators to be activated by electromagnetic radiation are chosen such that transmission of radiation and activation of the accelerators in the depth are possible. Systems that are reactive in the ultraviolet spectral range are usually chosen here. These systems are mostly very clearly delimitable from thermally curing systems, since customary photoinitiators react only to incident light. In this case, the concentration of the most reactive accelerator will be correspondingly low, such that the incident radiation is not completely absorbed directly at the surface.

Accordingly, it is possible to provide a combination of a plurality of initiators which enable deep transmission of radiation and deep curing in this way. It is thus possible to cure relatively thick layers of up to one millimeter. A system catalyzed in this way can likewise be initiated and cured in filled form with a customary varnish layer thickness of up to 0.5 mm since the formulation of the initiators has the effect that curing of the matrix is continued even in the shadow region of the filler particles.

If one percent initiator has been included in a radiation-curing chemical formulation, for example, initiators having a high efficiency, i.e. a high photon yield, must already be chosen even in the case of slightly filled systems.

In the case of the cationic photoinitiator bis[4(diphenylsulfonium)phenyl] sulfide bishexafluoro-antimonate, the ratio of incident phonons to the production of reactive particles is almost equal to one. This has the consequence that the surface cures at high speed and the initiator traps/absorbs all phonons almost already at the surface.

However, the formulation can also be fashioned in such a way that a plurality of initiators in combination are used instead of one initiator. A percentage increase in the total content of the initiator is not absolutely necessary in this case. The initiators are chosen in this case such that each absorbs a specific wavelength segment of the UV light.

By way of example, the photoinitiator 2,4,6-trimethylbenzoyldiphenylphosphine oxide (TPO) greatly absorbs radiation in the UV-A range with a maximum at ~370 nm, and it is transmissive to radiation having a shorter wavelength. The photoinitiator methyl-o-benzoylbenzoate (MOBB) absorbs in the shorter-wave UV range.

By means of a synergist, the excitation can likewise be forced in the case of intervening wavenumbers, such that virtually the entire UV spectrum can be effectively utilized for curing. As a result, greatly filled materials can then also be fully cured. In this case, the curing can be initiated for example by an F-emitter or G-emitter or by a series connection comprising both emitters.

The curing of highly filled materials has never yet been satisfactorily achieved using electromagnetic radiation. Therefore, hitherto there has also never been the possibility of realizing such a fast-curing varnish which at the same time is provided to a high degree with a partly conductively functionalized filler and can thus be used as an overhang corona shield.

This can now be achieved by the combination of a correspondingly depth-reactive UV resin with the functionalized filler.

The skillful combination of photoinitiators is very important in such a system. In order to be able to utilize the wavelength spectrum optimally, different photoinitiators are combined with one another. They react to different excitation wavelengths and enable the partial transmission of the radiation into the depth of the system. Even if a filler traps large parts of the radiation, nevertheless full curing can still be achieved in the depth. Ultimately, a good hardness and also adhesion are thus achieved. By adding further components, so-called additives, it is possible to set specific properties such as flexibility and adhesion.

If 2,4,6-trimethylbenzoyldiphenylphosphine oxide (TPO) initiates a free radical curing mechanism, formulations which are started by means of a cationic reaction mechanism are also conceivable, in principle. Thus, customary epoxy resins can also be formulated and well-crosslinked layer systems can thus be achieved. By addition of phosphorus compounds, it is additionally possible to reduce the self-extinguishment in the case of fire.

Examples of a thermal and a photosensitive initiator include bis[4(diphenylsulfonium)phenyl] sulfide bishexafluoro-antimonate, also miscible for "dual cure" applications; claim 4 reveals a likewise only exemplary portfolio of matrix molecules. It can be discerned therefrom that radiation-curing systems, not only in the choice of their initiators, synergy lists, stabilizers and further additives, but also in the choice of the actual reaction resin matrix, are totally free and this affords a very good possibility of elaborating formulations having specified properties.

In this case, the systems that can be utilized cover virtually every conceivable industrially available group of chemically crosslinkable molecules.

The evident advantages of the new formulation are:
As a result of the curing by means of radiation, the time until the next overcoating can be reduced to approximately 180 seconds, whereas conventional systems in use require approximately 4 hours curing time per coated ply. In other words, the expenditure until the completion of the overhang corona shield, e.g. of a generator bar, is reduced from several days and distribution over several operating work shifts to a few minutes.
As a result of the adjustable viscosity, the varnish can be formulated as both sprayable and spreadable.
The system can be set to have very low flammability and thus fulfill UL-94 V-Q and further combustibility restrictions and standards.
By choosing a urethanized acrylate as matrix material, it is possible for example to increase the thermal resistance and thus the heat stability class (HSC) to up to 180° C.
In addition, the scratch resistance is improved.
Virtual or complete freedom from solvents can be achieved.

Figure 7:
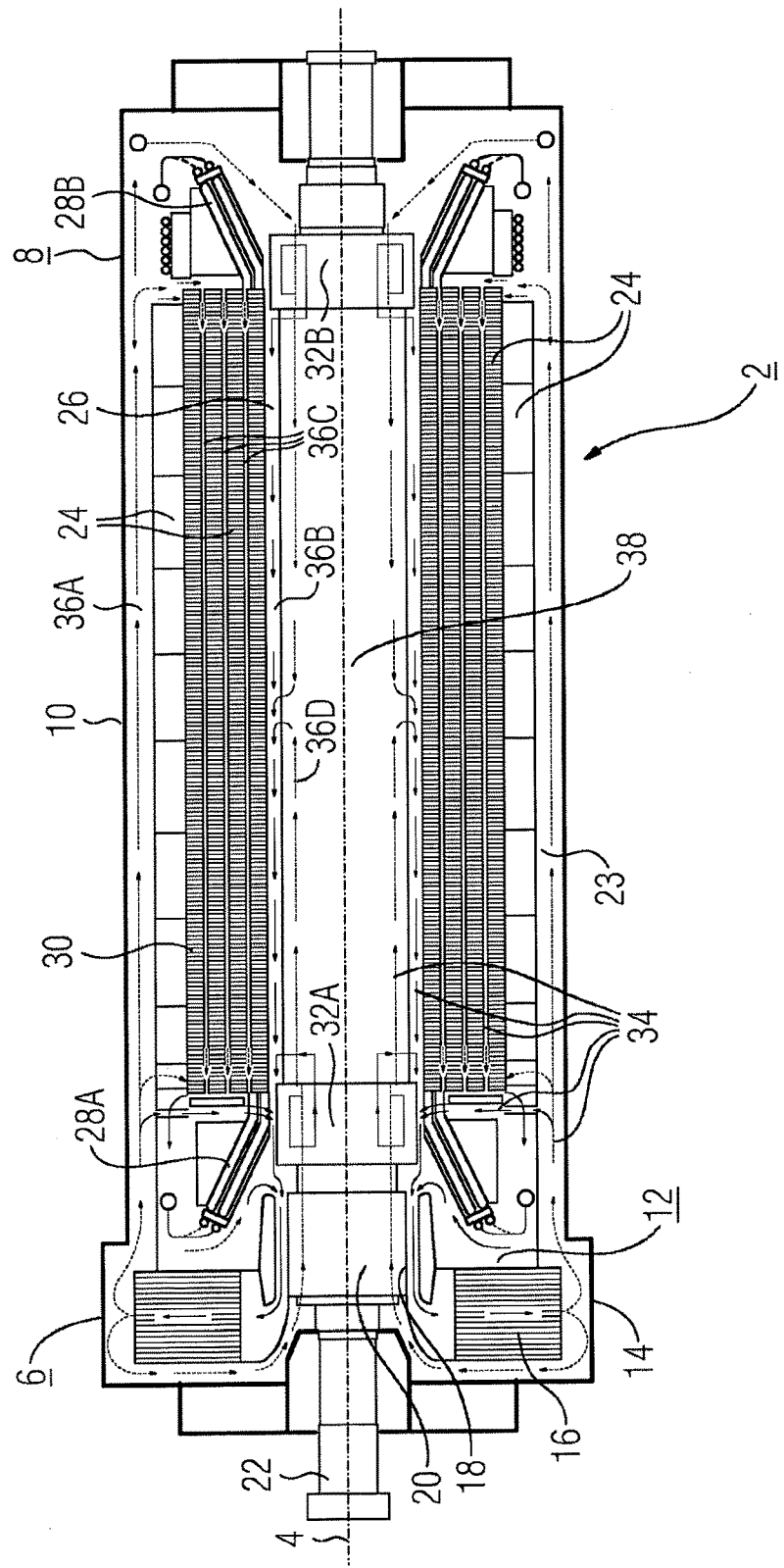
FIG. 7 shows a generator.

In accordance with FIG. 7, a rotary machine arrangement, in particular a generator arrangement 2, extends along a longitudinal axis 4 from a turbine-side end region 6 to an excitation-side end region 8. The generator arrangement 2 has a housing 10. A cooling device 12 is arranged in the turbine-side end region 6. To be precise, two coolers 16 and a compressor in the form of a fan 18 having a fan hub 20 are arranged in a cooler head 14, which is a part of the housing 10. The fan hub 20 is seated on a rotor 22 extending along the longitudinal axis 4 through the generator arrangement 2. The actual generator region 23 is arranged after the cooling device 12 in the direction of the longitudinal axis 4. In this region, the rotor 22 is surrounded by a stator 24 with the formation of an air gap 26. The stator 24 has a stator winding having a turbine-side stator winding overhang 28A and having an excitation-side stator winding overhang 28B. A so-called laminate stack 30 is arranged between the two stator winding overhangs 28A, 28B. Analogously to the stator 24, the rotor 22 has a turbine-side rotor winding overhang 32A and an excitation-side rotor winding overhang 32B.

On account of the high power density that is customary in turbogenerators, it is necessary to cool the generator arrangement 2 in the generator region 23. In this case, the stator winding overhangs 28A, 28B and the rotor winding overhangs 32A, 32B have a particularly high cooling demand. In order to cool the generator region 23, the latter has a cooling system 34 supplied with cooling gas by the cooling device 12. The cooling system 34 has a number of cooling gas ducts 36A-D, 38 via which the cooling gas is guided in a circulation. In this case, a first cooling gas duct 36A extends in the axial direction and is arranged between the stator 24 and the housing 10. A second cooling gas duct 36B is formed by the air gap 26. Further cooling gas ducts 36C extending in the axial direction lead through the laminate stack 30. In order to cool the rotor 22, a cooling gas duct 36D leads through said rotor. The cooling gas flow in the generator region 23 and in the cooling device 12 is indicated in each case by arrows, wherein the dashed arrows indicate the flow path of the cold cooling gas and the solid arrows indicate the flow path of the heated cooling gas (hot gas).

In order to cool the stator winding overhangs 28A, 28B, the cooling gas flow coming from the coolers 16 is divided in the turbine-side end region 6. One partial flow serves for cooling the turbine-side stator winding overhang 28A and the other partial flow is forwarded via the cooling gas duct 36A to the excitation-side stator winding overhang 28B and divided again. One part serves for cooling the stator winding overhang 28B and flows back again from there as hot gas via the air gap 26. The other part is conducted through the cooling gas ducts 36C of the laminate stack 30 and emerges as hot gas in the turbine-side end region 6 and is fed to the coolers 16. In order to cool the rotor winding overhangs 32A, 32B, cooling gas is introduced into the cooling gas duct 36D of the rotor 22 both from the turbine-side end region 6 and from the excitation-side end region 8. A partial flow of the cooling gas flows through the respective rotor winding overhangs 32A, 32B and is subsequently conducted into the air gap 26 as hot gas and fed to the coolers 16. The remaining partial flow is guided further through the rotor 22 in the cooling gas duct 36D, to be precise in such a way that the cooling gas from the two rotor winding overhangs 32A, 32B flows toward one another and is conducted into the air gap 26 for instance in the central region 38 of the generator region 23.

The invention claimed is:

1. A corona shield for electric machines, comprising: a varnish having a thickness in the range of 0.5 mm-1 mm that includes a UV-cured matrix material comprising cross-linked molecules, and an electrically semiconducting filler.

2. The corona shield as claimed in claim 1, wherein a proportion of the semiconducting filler in the shield is 30% by weight to 90% by weight.

3. The corona shield as claimed in claim 1, wherein the corona shield is further comprised of an electromagnetic radiation-cured material made of a curable material from a group consisting of bisphenol A diglycidyl ether (BADGE), bisphenol F diglycidyl ether (BFDGE), 3,4-epoxycyclohexylmethyl-3',4'-epoxy-cyclohexane carboxylate, phenol novolak, acrylate, urethane, and end ether.

4. An electric machine which includes a corona shield as claimed in claim 1.

5. The electric machine as in claim 4, wherein the machine is a generator.

6. A corona shield for electric machines, comprising: a varnish that includes a UV-cured matrix material comprising cross-linked molecules, and an electrically semiconducting filler, wherein the electrically semiconducting filler comprises at least one of silicon carbide and graphite.

7. A corona shield for electric machines, comprising: a varnish that includes a UV-cured matrix material comprising cross-linked molecules, and an electrically semiconducting filler, wherein the corona shield further comprises a heat-cured material.

8. The corona shield as claimed in claim 7, wherein the heat-cured material comprises cross-linked molecules.

* * * * *